US012551428B2

(12) United States Patent
D'Arras

(10) Patent No.: US 12,551,428 B2
(45) Date of Patent: Feb. 17, 2026

(54) COSMETIC COMPOSITION COMPRISING ANIONIC AND AMPHOTERIC SURFACTANTS, CATIONIC POLYSACCHARIDES AND UNSATURATED FATTY ALCOHOLS, AND COSMETIC TREATMENT PROCESS

(71) Applicant: L'OREAL, Paris (FR)

(72) Inventor: Marie-Florence D'Arras, Saint-Ouen (FR)

(73) Assignee: L'Oréal, Paris (FR)

( * ) Notice: Subject to any disclaimer, the term of this patent is extended or adjusted under 35 U.S.C. 154(b) by 860 days.

(21) Appl. No.: 17/626,756

(22) PCT Filed: Jul. 1, 2020

(86) PCT No.: PCT/EP2020/068449
§ 371 (c)(1),
(2) Date: Jan. 12, 2022

(87) PCT Pub. No.: WO2021/008870
PCT Pub. Date: Jan. 21, 2021

(65) Prior Publication Data
US 2022/0249353 A1 Aug. 11, 2022

(30) Foreign Application Priority Data
Jul. 17, 2019 (FR) ...................... 1908067

(51) Int. Cl.
*A61K 8/73* (2006.01)
*A61K 8/34* (2006.01)
*A61K 8/44* (2006.01)
*A61K 8/46* (2006.01)
*A61K 8/81* (2006.01)
*A61K 8/92* (2006.01)
*A61Q 5/02* (2006.01)

(52) U.S. Cl.
CPC .............. *A61K 8/737* (2013.01); *A61K 8/342* (2013.01); *A61K 8/44* (2013.01); *A61K 8/463* (2013.01); *A61K 8/8182* (2013.01); *A61K 8/922* (2013.01); *A61Q 5/02* (2013.01)

(58) Field of Classification Search
CPC .......... A61K 8/737; A61K 8/342; A61K 8/44; A61K 8/463; A61K 8/8182; A61K 8/922; A61Q 5/02
See application file for complete search history.

(56) References Cited

U.S. PATENT DOCUMENTS 3,472,840 A 10/1969 Stone et al.
3,589,978 A 6/1971 Kamal et al.
3,910,862 A 10/1975 Barabas et al.
4,031,307 A 6/1977 DeMartino et al.
4,131,576 A 12/1978 Iovine et al.
4,165,367 A 8/1979 Chakrabarti
5,869,070 A 2/1999 Dixon et al.
5,876,705 A 3/1999 Uchiyama et al.
6,475,474 B1 11/2002 Ricca
10,993,891 B2 5/2021 Mathonneau et al.
11,304,881 B2 4/2022 Demarcq et al.
2003/0086953 A1* 5/2003 Ricca ..................... A61K 8/817
424/401
2012/0247498 A1 10/2012 Mathonneau
2012/0247499 A1 10/2012 Mathonneau
2018/0235893 A1* 8/2018 Zhang ..................... A61Q 15/00

FOREIGN PATENT DOCUMENTS

| FR | 1492597 A | 8/1967 | |
| FR | 2077143 A5 | 10/1971 | |
| FR | 2393573 A1 | 1/1979 | |
| FR | 2773710 A1 | 7/1999 | |
| FR | 3044897 A1 | 6/2017 | |
| FR | 3076217 A1 | 7/2019 | |
| JP | 2017-538738 A | 12/2017 | |
| JP | 2018-538305 A | 12/2018 | |
| WO | WO-9418292 A1 * | 8/1994 | ............... A61K 8/39 |
| WO | 2011/073563 A1 | 6/2011 | |
| WO | 2011/073564 A2 | 6/2011 | |
| WO | 2016/092189 A2 | 6/2016 | |
| WO | 2017/083943 A1 | 5/2017 | |
| WO | 2017/102727 A1 | 6/2017 | |
| WO | 2019/134855 A1 | 7/2019 | |

OTHER PUBLICATIONS

Translation of Notice of Reasons for Refusal for Application No. 2022-502232, dated Jan. 23, 2023.
International Search Report and Written Opinion for counterpart Application No. PCT/EP2020/068449, dated Aug. 5, 2020.
Porter, M.R., "Handbook of Surfactants," published by Blackie & Son (Glasgow and London), 1991, pp. 116-178.
Chinese Office Action for CN Application No. 202080050850.6, dated Mar. 20, 2023 (as of Aug. 31, 2023 translation unavailable).

* cited by examiner

*Primary Examiner* — Blessing M Fubara
(74) *Attorney, Agent, or Firm* — The Marbury Law Group, PLLC

(57) ABSTRACT

The present invention relates to a cosmetic composition, notably a hair composition, comprising anionic surfactants, amphoteric surfactants, cationic polysaccharides and unsaturated fatty alcohols present in a content of less than 1% by weight relative to the total weight of the composition. The invention also relates to a cosmetic treatment process for caring for and/or cleansing the hair, using said composition.

20 Claims, No Drawings

COSMETIC COMPOSITION COMPRISING ANIONIC AND AMPHOTERIC SURFACTANTS, CATIONIC POLYSACCHARIDES AND UNSATURATED FATTY ALCOHOLS, AND COSMETIC TREATMENT PROCESS

CROSS REFERENCE TO RELATED APPLICATION

This is a U.S. National Stage application of International Application No. PCT/EP2020/068449, filed Jul. 1, 2020, which claims priority to French Application No. 1908067, filed Jul. 17, 2019, both of which are incorporated by reference herein in their entireties.

The present invention relates to a composition, notably a cosmetic composition, in particular a hair composition, comprising one or more anionic surfactants, one or more amphoteric surfactants, one or more unsaturated fatty alcohols and one or more cationic polymers. The invention also relates to a cosmetic treatment process using said composition. These compositions are more particularly intended for cleansing and/or conditioning keratin materials, notably the hair.

It is common practice to use detergent cosmetic compositions such as shampoos or shower gels, based essentially on surfactants, for washing keratin materials such as the skin and the hair. These compositions are generally applied to the keratin materials, which are preferably wet, and the foam generated by massaging or rubbing with the hands or a washing mitt makes it possible, after rinsing with water, to remove the diverse types of soiling initially present on the hair or the skin. These base compositions have good washing power, but their intrinsic cosmetic properties however remain quite poor, notably due to the fact that the relatively aggressive nature of such a cleansing treatment may in the long term give rise to more or less pronounced damage on hair fibres, associated in particular with the gradual removal of the fats or proteins contained in or at their surface. Thus, to improve the cosmetic properties of the above detergent compositions, and more particularly of those that are required to be applied to sensitized hair (i.e. hair that is generally damaged or embrittled by the action of external atmospheric agents such as light and bad weather, and/or mechanical or chemical treatments such as blow-drying, combing, dyeing, bleaching, permanent-waving and/or relaxing), it is now common practice to introduce into these compositions additional cosmetic agents known as conditioning agents, which are intended mainly to repair or limit the harmful or undesirable effects caused by the various treatments or attacking factors to which keratin materials are more or less repeatedly subjected, notably keratin fibres and in particular the hair. These conditioning agents may, of course, also improve the cosmetic behaviour of natural hair.

It is thus known practice to use cationic polymers and/or silicones as conditioning agents in detergent cosmetic compositions such as shampoos, to give the hair satisfactory cosmetic properties, in particular in terms of sheen, softness, lightness, a natural feel and improved disentangling.

Mention may notably be made of FR 2 773 710 which describes aqueous cosmetic compositions comprising anionic and amphoteric surfactants and cationic polysaccharides.

It has also been envisaged to propose compositions with a novel visual appearance, namely compositions that are particularly clear, or even transparent; however, the introduction of fatty substances, even when liquid, may have an impact on the clarity of the compositions.

Thus, the current compositions for washing and/or conditioning keratin materials still have several drawbacks: the presence of silicone, the environmental profile of which is not always optimal, the generally creamy and opaque appearance of the composition associated with the presence of the conditioning agents, the start of foaming and the foam quality which are still not entirely satisfactory, rapid regreasing of the hair accompanied by lankness.

There is thus a real need for clear cosmetic compositions intended for cleansing/washing keratin materials, preferably not comprising any silicone ("silicone-free"), having good working properties such as good intrinsic washing power, while at the same time making it possible to obtain excellent cosmetic properties, in particular in terms of disentangling, suppleness, manageability, a soft feel and smoothing of the treated hair.

The Applicant has discovered, surprisingly, that it is possible to formulate detergent and conditioning compositions for keratin materials, having the desired properties, by combining anionic and amphoteric surfactants with particular cationic polymers and particular fatty alcohols.

One subject of the present invention is thus a cosmetic composition, notably a hair composition, comprising:
  one or more anionic surfactants,
  one or more amphoteric surfactants,
  one or more cationic polysaccharides, and
  one or more unsaturated fatty alcohols in a total content of less than 1% by weight, relative to the total weight of the composition.

The composition according to the invention has good detergent or washing properties, and has good tolerance notably with respect to the skin, mucous membranes, the scalp and the eyes, while at the same time leading to good conditioning of keratin materials.

The composition according to the invention makes it possible rapidly to obtain an abundant foam of very good quality. The foam is homogeneous and shows good persistence over time. It spreads easily and uniformly on keratin materials and rinses off easily.

In addition, the composition according to the invention affords good cosmetic properties to keratin materials, notably to the hair, in particular to sensitized hair. After rinsing, the hair is easy to disentangle, supple, smooth and has a soft feel.

By means of the invention, it is also possible to obtain a cosmetic composition that is advantageously clear, and transparent to translucent, more preferentially transparent.

The term "clear composition" means a composition which can be seen through distinctly with the naked eye.

The transparency of the composition may be characterized by measuring its transmittance. In the context of the present invention, the transmittance measurements are taken at 25° C. and at atmospheric pressure (1 atm) with a Cary Type 100 scan UV-visible spectrophotometer.

Preferably, the transmittance of the composition according to the invention, measured at room temperature (25° C.) and atmospheric pressure, is greater than or equal to 80%, preferentially greater than or equal to 85%, even more preferentially greater than or equal to 90%, or even greater than or equal to 92% and better still greater than or equal to 94%; in particular ranging from 80% to 100%, or even from 85% to 100%, notably from 90% to 100%, or even from 92% to 98%.

The composition is particularly suitable for use on fine and/or damaged and/or sensitized hair; the hair is easy to disentangle and to style, supple and light, and has a soft feel.

The composition according to the invention preferably has a thickened texture, which allows it to be spread on the hair easily while avoiding running on application, for example into the eyes; it has also been found that the composition according to the invention is particularly stable.

The viscosity of the composition according to the invention may be evaluated by determining, at a temperature of 25° C., the flow time of an amount of product (for example 90 g of poured product) through a calibrated orifice using a Ford cup viscometer, equipped with a Ford cup with an orifice diameter of 8 mm (cF8). Preferably, the flow time of the composition according to the invention is greater than or equal to 20 seconds, notably greater than or equal to 30 seconds, better still greater than or equal to 40 seconds; in particular between 20 and 200 seconds, better still between 30 and 150 seconds, or even between 40 and 100 seconds, better still between 50 and 90 seconds.

In the present description, the expression "at least one" is equivalent to the expression "one or more" and may be replaced therewith.

In the present description, the expression "between" is equivalent to the expression "ranging from" and may be replaced therewith; in these expressions, the limits are considered as being included.

1/Anionic Surfactants

The cosmetic composition according to the invention comprises one or more anionic surfactants.

The term "anionic surfactant" means a surfactant including, as ionic or ionizable groups, only anionic groups.

In the present description, a species is termed as being "anionic" when it bears at least one permanent negative charge or when it can be ionized as a negatively charged species, under the conditions of use of the composition of the invention (for example the medium or the pH) and not comprising any cationic filler.

The anionic surfactants may be sulfate, sulfonate and/or carboxylic (or carboxylate) surfactants. Needless to say, a mixture of these surfactants may be used.

It is understood in the present description that:
  the carboxylate anionic surfactants comprise at least one carboxylic or carboxylate function (—COOH or —COO⁻) and may optionally also comprise one or more sulfate and/or sulfonate functions;
  the sulfonate anionic surfactants comprise at least one sulfonate function (—SO$_3$H or —SO$_3$) and may optionally also comprise one or more sulfate functions, but do not comprise any carboxylate functions; and
  the sulfate anionic surfactants comprise at least one sulfate function but do not comprise any carboxylate or sulfonate functions.

The carboxylic anionic surfactants that may be used thus include at least one carboxylic or carboxylate function (—COOH or —COO⁻).

They may be chosen from the following compounds: acylglycinates, acyllactylates, acylsarcosinates, acylglutamates; alkyl ether carboxylic acids, alkyl(C6-30 aryl)ether carboxylic acids, alkyl-D-galactosideuronic acids, alkylamido ether carboxylic acids; and also the salts of these compounds; the alkyl and/or acyl groups of these compounds including from 6 to 30 carbon atoms, notably from 12 to 28, better still from 14 to 24 or even from 16 to 22 carbon atoms; the aryl group preferably denoting a phenyl or benzyl group; these compounds possibly being polyoxyalkylenated, notably polyoxyethylenated, and then preferably including from 1 to 50 ethylene oxide units, better still from 2 to 10 ethylene oxide units. Use may also be made of the C6-C24 alkyl monoesters of polyglycoside-polycarboxylic acids, such as C6-C24 alkyl polyglycoside-citrates, C6-C24 alkyl polyglycoside-tartrates and C6-C24 alkyl polyglycoside-sulfosuccinates, and salts thereof.

Among the above carboxylic surfactants, mention may be made most particularly of polyoxyalkylenated alkyl(amido) ether carboxylic acids and salts thereof, in particular those including from 2 to 50 alkylene oxide and in particular ethylene oxide groups, such as the compounds sold by the company Kao under the Akypo names. The polyoxyalkylenated alkyl(amido) ether carboxylic acids that may be used are preferably chosen from those of formula (1):

$$R_1\text{—}(OC_2H_4)_{n'}\text{—}OCH_2COOA \qquad (1)$$

in which:
  $R_{1'}$ represents a linear or branched C6-C24 alkyl or alkenyl radical, a (C8-C9)alkylphenyl radical, a radical $R_{2'}CONH\text{—}CH2\text{-}CH2\text{-}$ with $R_{2'}$ denoting a linear or branched C9-C21 alkyl or alkenyl radical; preferably, is a C8-C20, preferably C8-C18, alkyl radical;
  n' is an integer or decimal number (mean value) ranging from 2 to 24 and preferably from 2 to 10,
  A denotes H, ammonium, Na, K, Li, Mg or a monoethanolamine or triethanolamine residue.

Use may also be made of mixtures of compounds of formula (1), in particular mixtures of compounds bearing different groups Rt.

The polyoxyalkylenated alkyl(amido) ether carboxylic acids that are particularly preferred are those of formula (1) in which:
  $R_{1'}$ denotes a linear or branched C8-C22, notably C10-C16 or even C12-C14 alkyl radical, or alternatively a (C8-C9)alkylphenyl radical;
  A denotes a hydrogen or sodium atom, and
  n' ranges from 2 to 20, preferably from 2 to 10.

Even more preferentially, use is made of the compounds of formula (1) in which denotes a C12-C14 alkyl, cocoyl, oleyl, nonylphenyl or octylphenyl radical, A denotes a hydrogen or sodium atom and n' ranges from 2 to 10.

Among the commercial products that may preferably be used are the products sold by the company KAO under the names:
  Akypo® NP 70 ($R_1$=nonylphenyl, n=7, A=H)
  Akypo® NP 40 ($R_1$=nonylphenyl, n=4, A=H)
  Akypo® OP 40 ($R_1$=octylphenyl, n=4, A=H)
  Akypo® OP 80 ($R_1$=octylphenyl, n=8, A=H)
  Akypo® OP 190 ($R_1$=octylphenyl, n=19, A=H)
  Akypo® RLM 38 ($R_1$=($C_{12}$-$C_{14}$)alkyl, n=4, A=H)
  Akypo® RLM 38 NV ($R_1$=($C_{12}$-$C_{14}$)alkyl, n=4, A=Na)
  Akypo® RLM 45 CA ($R_1$=($C_{12}$-$C_{14}$)alkyl, n=4.5, A=H)
  Akypo® RLM 45 NV ($R_1$=($C_{12}$-$C_{14}$)alkyl, n=4.5, A=Na)
  Akypo® RLM 100 ($R_1$=($C_{12}$-$C_{14}$)alkyl, n=10, A=H)
  Akypo® RLM 100 NV ($R_1$=($C_{12}$-$C_{14}$)alkyl, n=10, A=Na)
  Akypo® RLM 130 ($R_1$=($C_{12}$-$C_{14}$)alkyl, n=13, A=H)
  Akypo® RLM 160 NV ($R_1$=($C_{12}$-$C_{14}$)alkyl, n=16, A=Na), or by the company Sandoz under the names:
  Sandopan DTC-Acid ($R_1$=($C_{13}$)alkyl, n=6, A=H)
  Sandopan DTC ($R_1$=($C_{13}$)alkyl, n=6, A=Na)
  Sandopan LS 24 ($R_1$=($C_{12}$-$C_{14}$)alkyl, n=12, A=Na)
  Sandopan JA 36 ($R_1$=($C_{13}$)alkyl, n=18, A=H),
  and more particularly the products sold under the following names:
  Akypo® RLM 45 (INCI: Laureth-5 carboxylic acid)
  Akypo® RLM 100
  Akypo® RLM 38.

Preferentially, the carboxylic anionic surfactants are chosen, alone or as a mixture, from:
  acylglutamates, notably of C6-C24 or even C12-C20, such as stearoylglutamates, and in particular disodium stearoylglutamate;
  acylsarcosinates, notably of C6-C24 or even C12-C20, such as palmitoylsarcosinates, and in particular sodium palmitoylsarcosinate;
  acyllactylates, notably of C12-C28 or even C14-C24, such as behenoyllactylates, and in particular sodium behenoyllactylate;
  C6-C24 and notably C12-C20 acylglycinates;
  (C6-C24)alkyl ether carboxylates, and notably (C12-C20) alkyl ether carboxylates; in particular those including from 2 to 50 ethylene oxide groups;
  polyoxyalkylenated (C6-C24)alkylamido ether carboxylic acids, in particular those including from 2 to 50 ethylene oxide groups;
  in particular in acid form or in the form of alkali metal or alkaline-earth metal, ammonium or amino alcohol salts.

Polyoxyalkylenated ($C_6$-$C_{24}$)alkyl ether carboxylic acids and salts thereof are preferably used.

The sulfonate anionic surfactants that may be used include at least one sulfonate function (—$SO_3H$ or —$SO_3$). They may be chosen from the following compounds: alkylsulfonates, alkyl ether sulfonates, alkylamidesulfonates, alkylarylsulfonates, α-olefin sulfonates, paraffin sulfonates, alkyl sulfosuccinates, alkyl ether sulfosuccinates, alkylamidesulfosuccinates, alkylsulfoacetates, N-acyltaurates, acylisethionates; alkylsulfolaurates; and also the salts of these compounds; the alkyl groups of these compounds including from 6 to 30 carbon atoms, notably from 12 to 28, better still from 14 to 24 or even from 16 to 22 carbon atoms; the aryl group preferably denoting a phenyl or benzyl group;

these compounds possibly being polyoxyalkylenated, notably polyoxyethylenated, and then preferably including from 1 to 50 ethylene oxide units and better still from 2 to 10 ethylene oxide units.

Preferentially, the sulfonate anionic surfactants are chosen, alone or as a mixture, from:
  C6-C24 and notably C12-C20 olefin sulfonates;
  C6-C24 and notably C12-C20 alkylsulfosuccinates, notably laurylsulfosuccinates;
  C6-C24 and notably C12-C20 alkyl ether sulfosuccinates;
  (C6-C24)acylisethionates and preferably (C12-C18)acylisethionates; in particular in the form of alkali metal or alkaline-earth metal, ammonium or amino alcohol salts.

The sulfate anionic surfactants that may be used include at least one sulfate function (—$OSO_3H$ or —$OSO_3^-$).

They may be chosen from the following compounds: alkyl sulfates, alkyl ether sulfates, alkylamido ether sulfates, alkylaryl polyether sulfates, monoglyceride sulfates; and the salts of these compounds;
  the alkyl groups of these compounds including from 6 to 30 carbon atoms, notably from 12 to 28, better still from 14 to 24 or even from 16 to 22 carbon atoms; the aryl group preferably denoting a phenyl or benzyl group;
  these compounds possibly being polyoxyalkylenated, notably polyoxyethylenated, and then preferably including from 1 to 50 ethylene oxide units and better still from 2 to 10 ethylene oxide units.

Preferentially, the sulfate anionic surfactants are chosen, alone or as a mixture, from:
  alkyl sulfates, notably of C6-C24 or even C12-C20, and
  alkyl ether sulfates, notably of C6-C24 or even C12-C20, preferably comprising from 2 to 20 ethylene oxide units;
  in particular in the form of alkali metal or alkaline-earth metal, ammonium or amino alcohol salts.

When the anionic surfactant is in salt form, said salt may be chosen from alkali metal salts, such as the sodium or potassium salt, ammonium salts, amine salts and in particular amino alcohol salts, and alkaline-earth metal salts, such as the magnesium salt.

Examples of amino alcohol salts that may be mentioned include monoethanolamine, diethanolamine and triethanolamine salts, monoisopropanolamine, diisopropanolamine or triisopropanolamine salts, 2-amino-2-methyl-1-propanol salts, 2-amino-2-methyl-1,3-propanediol salts and tris(hydroxymethyl)aminomethane salts.

Alkali metal or alkaline-earth metal salts and in particular the sodium or magnesium salts are preferably used.

Preferentially, the anionic surfactants are chosen, alone or as a mixture, from:
  C6-C24 and notably C12-C20 alkyl sulfates;
  C6-C24 and notably C12-C20 alkyl ether sulfates; preferably comprising from 2 to 20 ethylene oxide units;
  C6-C24 and notably C12-C20 alkylsulfosuccinates, notably laurylsulfosuccinates;
  C6-C24 and notably C12-C20 olefin sulfonates;
  C6-C24 and notably C12-C20 alkyl ether sulfosuccinates;
  (C6-C24)acylisethionates and preferably (C12-C18)acylisethionates;
  C6-C24 and notably C12-C20 acylsarcosinates; notably palmitoylsarcosinates;
  (C6-C24)alkyl ether carboxylates, preferably (C12-C20) alkyl ether carboxylates; in particular those including from 2 to 50 ethylene oxide groups;
  polyoxyalkylenated (C6-C24)alkylamido ether carboxylic acids and salts thereof, in particular those including from 2 to 50 alkylene oxide and in particular ethylene oxide groups;
  C6-C24 and notably C12-C20 acylglutamates;
  C6-C24 and notably C12-C20 acylglycinates;
  in particular in acid form or in the form of alkali metal or alkaline-earth metal, ammonium or amino alcohol salts.

Preferentially, the composition comprises one or more sulfate anionic surfactants, preferably one or more C6-C24 and notably C12-C20 alkyl sulfates, and/or one or more C6-C24 and notably C12-C20 alkyl ether sulfates; preferably comprising from 2 to 20 ethylene oxide units, particularly in the form of alkali metal or alkaline-earth metal, ammonium or amino alcohol salts.

The anionic surfactant(s) are preferably present in the composition according to the invention in a total content ranging from 2% to 30% by weight, notably from 4% to 25% by weight, better still from 5% to 20% by weight and even better still from 6% to 15% by weight relative to the total weight of the composition.

2/Amphoteric Surfactants

The composition according to the invention also comprises one or more amphoteric surfactants.

In particular, the amphoteric surfactants are non-silicone surfactants. They may notably be optionally quaternized secondary or tertiary aliphatic amine derivatives, in which the aliphatic group is a linear or branched chain including from 8 to 22 carbon atoms, said amine derivatives containing at least one anionic group, for instance a carboxylate, sulfonate, sulfate, phosphate or phosphonate group.

Mention may in particular be made of $(C_8-C_{20})$alkylbetaines, $(C_8-C20)$alkylsulfobetaines, $(C_8-C_{20})$alkylamido $(C_3-C_8)$alkylbetaines and $(C_8-C_{20})$alkylamido$(C_6-C_8)$alkylsulfobetaines; alone or as a mixture, notably with the compounds mentioned below.

Among the optionally quaternized derivatives of secondary or tertiary aliphatic amines that may be used, as defined above, mention may also be made of the compounds having the respective structures (II) and (III) below:

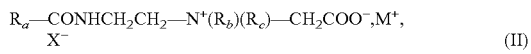

$$R_a\text{—}CONHCH_2CH_2\text{—}N^+(R_b)(R_c)\text{—}CH_2COO^-,M^+, X^- \quad (II)$$

in which:
$R_a$ represents a $C_{10}$ to $C_{30}$ alkyl or alkenyl group derived from an acid $R_aCOOH$ preferably present in hydrolysed coconut kernel oil, or a heptyl, nonyl or undecyl group;
$R_b$ represents a β-hydroxyethyl group; and
$R_c$ represents a carboxymethyl group;
$M^+$ represents a cationic counterion derived from an alkali metal or alkaline-earth metal, such as sodium, an ammonium ion or an ion derived from an organic amine; and
$X^-$ represents an organic or mineral anionic counterion, such as that chosen from halides, acetates, phosphates, nitrates, $(C_1-C_4)$alkyl sulfates, $(C_1-C_4)$alkyl- or $(C_1-C_4)$alkylaryl-sulfonates, in particular methyl sulfate and ethyl sulfate; or alternatively M+ and $X^-$ are absent;

$$R_a\text{—}CONHCH_2CH_2\text{—}N(B)(B') \quad (III)$$

in which:
B represents the group $\text{—}CH_2CH_2OX'$;
B' represents the group $\text{—}(CH_2)_zY'$, with z=1 or 2;
X' represents the group $\text{—}CH_2COOH$, $\text{—}CH_2\text{—}COOZ'$, $\text{—}CH_2CH_2COOH$ or $CH_2CH_2\text{—}COOZ'$, or a hydrogen atom;
Y' represents the group $\text{—}COOH$, $\text{—}COOZ'$ or $\text{—}CH_2CH(OH)SO_3H$ or the group $CH_2CH(OH)SO_3\text{—}Z'$;
Z' represents a cationic counterion derived from an alkali metal or alkaline-earth metal, such as sodium, an ammonium ion or an ion derived from an organic amine;
$R_{a'}$ represents a $C_{10}$ to $C_{30}$ alkyl or alkenyl group of an acid $R_a$—COOH which is preferably present in coconut kernel oil or in hydrolysed linseed oil, or an alkyl group, notably a $C_{17}$ group, and its iso form, or an unsaturated $C_{17}$ group.

These compounds are classified in the CTFA dictionary, 5th edition, 1993, under the names disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, disodium capryloamphodipropionate, lauroamphodipropionic acid and cocoamphodipropionic acid.

By way of example, mention may be made of the cocoamphodiacetate sold by the company Rhodia under the trade name Miranol® $C_2M$ Concentrate.

Use may also be made of compounds of formula (IV):

$$R_{a'}\text{—}NHCH(Y'')\text{—}(CH_2)_nCONH(CH_2)_{n'}\text{—}N(R_d)(R_e) \quad (IV)$$

in which:
Y'' represents the group $\text{—}COOH$, $\text{—}COOZ''$ or $\text{—}CH_2\text{—}CH(OH)SO_3H$ or the group $CH_2CH(OH)SO_3\text{—}Z''$;
$R_d$ and $R_e$, independently of each other, represent a $C_1$ to $C_4$ alkyl or hydroxyalkyl radical;
Z'' represents a cationic counterion derived from an alkali metal or alkaline-earth metal, such as sodium, an ammonium ion or an ion derived from an organic amine;
$R_{a'}$ represents a $C_{10}$ to $C_{30}$ alkyl or alkenyl group of an acid $R_a$—COOH which is preferably present in coconut kernel oil or in hydrolysed linseed oil;
n and n' denote, independently of each other, an integer ranging from 1 to 3.

Among the compounds of formula (IV), mention may be made of the compound classified in the CTFA dictionary under the name sodium diethylaminopropyl cocoaspartamide and sold by the company Chimex under the name Chimexane HB. These compounds may be used alone or as mixtures.

Among the amphoteric surfactants, use is preferably made of $(C_8-C_{20})$alkylbetaines such as cocoylbetaine, $(C_8-C_{20})$alkylamido$(C_3-C_8)$alkylbetaines such as cocamidopropylbetaine, and mixtures thereof, and the compounds of formula (IV) such as the sodium salt of diethylaminopropyl laurylaminosuccinamate (INCI name: sodium diethylaminopropyl cocoaspartamide). Preferentially, the amphoteric surfactants are chosen from $(C_8-C_{20})$alkylbetaines, $(C_8-C_{20})$alkylamido$(C_3-C_8)$alkylbetaines, and mixtures thereof.

Preferably, the cosmetic composition according to the invention comprises the amphoteric surfactant(s) in a total content ranging from 0.1% to 20% by weight, preferentially in a content ranging from 0.5% to 15% by weight and better still from 1% to 10% by weight or even from 1.5% to 7.5% by weight relative to the total weight of the composition.

3/Nonionic Surfactants

The cosmetic composition according to the invention may optionally comprise one or more nonionic surfactants, notably such as those described in the *Handbook of Surfactants* by M. R. Porter, published by Blackie & Son (Glasgow and London), 1991, pages 116-178.

Examples of nonionic surfactants that may be mentioned include the following compounds, alone or as a mixture:
  oxyalkylenated $(C_8-C_{24})$alkylphenols;
  saturated or unsaturated, linear or branched, oxyalkylenated or glycerolated $C_8-C_{40}$ alcohols, preferably including one or two fatty chains;
  saturated or unsaturated, linear or branched, oxyalkylenated $C_8$ to $C_{30}$ fatty acid amides;
  esters of saturated or unsaturated, linear or branched, $C_8$ to $C_{30}$ acids and of polyethylene glycols;
  preferably oxyethylenated esters of saturated or unsaturated, linear or branched, $C_8$ to $C_{30}$ acids and of sorbitol;
  esters of fatty acids and of sucrose;
  $(C_8-C_{30})$alkyl(poly)glucosides, $(C_8-C_{30})$alkenyl(poly)glucosides, which are optionally oxyalkylenated (0 to 10 oxyalkylene units) and comprise from 1 to 15 glucose units, $(C_8-C_{30})$alkyl(poly)glucoside esters;
  saturated or unsaturated oxyethylenated plant oils;
  condensates of ethylene oxide and/or of propylene oxide;
  N—$(C_8-C_{30})$alkylglucamine and N—$(C_8-C_{30})$acylmethylglucamine derivatives;
  amine oxides.

The oxyalkylene units are more particularly oxyethylene or oxypropylene units, or a combination thereof, preferably oxyethylene units.

The number of moles of ethylene oxide and/or of propylene oxide preferably ranges from 1 to 250, more particularly from 2 to 100 and better still from 2 to 50; the number of moles of glycerol notably ranges from 1 to 50 and better still from 1 to 10. Advantageously, the nonionic surfactants according to the invention do not comprise any oxypropylene units.

Preferably, they comprise a number of moles of ethylene oxide ranging from 1 to 250, notably from 2 to 100 and better still from 2 to 50.

As examples of glycerolated nonionic surfactants, use is preferably made of monoglycerolated or polyglycerolated $C_8$ to $C_{40}$ alcohols, comprising from 1 to 50 mol of glycerol and preferably from 1 to 10 mol of glycerol.

As examples of compounds of this type, mention may be made of lauryl alcohol containing 4 mol of glycerol (INCI name: Polyglyceryl-4 Lauryl Ether), lauryl alcohol containing 1.5 mol of glycerol, oleyl alcohol containing 4 mol of glycerol (INCI name: Polyglyceryl-4 Oleyl Ether), oleyl alcohol containing 2 mol of glycerol (INCI name: Polyglyceryl-2 Oleyl Ether), cetearyl alcohol containing 2 mol of glycerol, cetearyl alcohol containing 6 mol of glycerol, oleocetyl alcohol containing 6 mol of glycerol, and octadecanol containing 6 mol of glycerol.

Among the glycerolated alcohols, it is more particularly preferred to use the $C_8$ to $C_{10}$ alcohol containing 1 mol of glycerol, the $C_{10}$ to $C_{12}$ alcohol containing 1 mol of glycerol and the $C_{12}$ alcohol containing 1.5 mol of glycerol.

The nonionic surfactant(s) that may be used in the washing composition according to the invention are preferentially chosen, alone or as a mixture, from:

saturated or unsaturated, linear or branched, oxyethylenated $C_8$ to $C_{40}$ alcohols comprising from 1 to 100 mol of ethylene oxide, preferably from 2 to 50 and more particularly from 2 to 40 mol of ethylene oxide; they preferably include one or two fatty chains;

saturated or unsaturated oxyethylenated plant oils comprising from 1 to 100 and preferably from 2 to 50 mol of ethylene oxide;

$(C_8$-$C_{30})$alkyl(poly)glucosides, which are optionally oxyalkylenated, preferably with 0 to 10 mol of ethylene oxide and comprising 1 to 15 glucose units;

monoglycerolated or polyglycerolated $C_8$ to $C_{40}$ alcohols, comprising from 1 to 50 mol of glycerol and preferably from 1 to 10 mol of glycerol;

saturated or unsaturated, linear or branched, oxyalkylenated $C_8$ to $C_{30}$ fatty acid amides;

esters of saturated or unsaturated, linear or branched, $C_8$ to Cm acids and of polyethylene glycols;

preferably oxyethylenated esters of saturated or unsaturated, linear or branched, $C_8$ to $C_{30}$ acids and of sorbitol.

More preferentially, the nonionic surfactant(s) are chosen, alone or as a mixture, from:

saturated or unsaturated, linear or branched, oxyethylenated $C_8$ to $C_{40}$ alcohols comprising from 1 to 100 mol of ethylene oxide, preferably from 2 to 50 and more particularly from 2 to 40 mol of ethylene oxide and including one or two fatty chains, notably at least one $C_8$-$C_{20}$ and notably $C_{10}$-$C_{18}$ alkyl chain;

preferably oxyethylenated esters of saturated or unsaturated, linear or branched, $C_8$ to $C_{30}$ acids and of sorbitol; and $(C_8$-$C_{30})$alkyl(poly)glucosides, which are optionally oxyalkylenated, preferably comprising from 0 to 10 mol of ethylene oxide and comprising 1 to 15 glucose units.

In a particular embodiment, the composition comprises one or more nonionic surfactants of alkyl(poly)glycoside type of general formula:

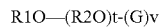

$$R1O\text{---}(R2O)t\text{-}(G)v$$

in which:

R1 represents a linear or branched alkyl or alkenyl radical including 6 to 24 carbon atoms and notably 8 to 18 carbon atoms, or an alkylphenyl radical of which the linear or branched alkyl radical includes 6 to 24 carbon atoms and notably 8 to 18 carbon atoms; preferably a saturated or unsaturated, linear or branched alkyl radical including from 8 to 18 carbon atoms;

R2 represents an alkylene radical including 2 to 4 carbon atoms;

G represents a sugar unit including 5 to 6 carbon atoms; preferably glucose, fructose or galactose; better still glucose;

t denotes a value ranging from 0 to 10, preferably 0 to 4, better still from 0 to 3 and even better still 0;

v denotes a value ranging from 1 to 15 and preferably from 1 to 4; the mean degree of polymerization (v) more particularly being between 1 and 2.

The glucoside bonds between the sugar units are generally of 1-6 or 1-4 type and preferably of 1-4 type.

Preferably, the alkyl(poly)glycoside surfactant is an alkyl (poly)glucoside surfactant.

Preferably, when they are present, the composition according to the invention comprises the nonionic surfactant(s) in a total content ranging from 0.05% to 15% by weight, preferably from 0.1% to 10% by weight and preferentially from 0.2% to 5% by weight, relative to the total weight of the composition according to the invention.

4/Unsaturated Fatty Alcohol

The cosmetic composition according to the invention also comprises one or more unsaturated fatty alcohols.

The unsaturated fatty alcohols that may be used in the context of the invention preferably comprise from 8 to 32 carbon atoms, notably from 12 to 28 carbon atoms, in particular from 14 to 24 carbon atoms and better still from 16 to 22 carbon atoms. They preferably comprise one or more double and/or triple unsaturations, i.e. one or more carbon-carbon double (C═C) or triple (C≡C) covalent bonds; preferentially one or more double unsaturations, better still only one double unsaturation (and no triple unsaturation).

Preferably, the unsaturated fatty alcohols are monoalcohols.

The unsaturated fatty alcohols that may be used in the context of the invention preferably correspond to the formula R—OH in which R is an unsaturated hydrocarbon-based radical comprising 8 to 32 carbon atoms, notably from 12 to 28 carbon atoms, in particular from 14 to 24 carbon atoms and better still from 16 to 22 carbon atoms; and optionally comprising one or more hydroxyl (OH) groups.

Preferably, R comprises one or more carbon-carbon double or triple covalent bonds; preferably one or more carbon-carbon double covalent bonds; better still only one carbon-carbon double covalent bond.

Preferentially, R is an unsaturated hydrocarbon-based radical comprising 8 to 32 carbon atoms, notably from 12 to 28 carbon atoms, in particular from 14 to 24 carbon atoms and better still from 16 to 22 carbon atoms; comprising only one double unsaturation (thus not comprising any triple unsaturations or any additional hydroxyl groups).

Preferably, the composition comprises one or more unsaturated fatty alcohols that are liquid at 25° C. and 1 atm.

Mention may be made in particular of oleyl alcohol, erucyl alcohol and linoleyl alcohol; and mixtures thereof.

Preferentially, the unsaturated fatty alcohol is oleyl alcohol.

The cosmetic composition according to the invention comprises the unsaturated fatty alcohol(s) in a total content of less than 1% by weight, relative to the total weight of the composition.

Preferably, the cosmetic composition according to the invention comprises the unsaturated fatty alcohol(s) in a total content ranging from 0.01% to 0.90% by weight, notably ranging from 0.02% to 0.80% by weight, better still ranging from 0.05% to 0.50% by weight and even better still ranging from 0.10% to 0.30% by weight, relative to the total weight of the composition.

Preferably, the composition according to the invention comprises oleyl alcohol in a total content of less than 1% by weight, relative to the total weight of the composition, notably ranging from 0.01% to 0.90% by weight, for example ranging from 0.02% to 0.80% by weight, better still ranging from 0.05% to 0.50% by weight and even better still ranging from 0.10% to 0.30% by weight, relative to the total weight of the composition.

5/Cationic Polysaccharides

The cosmetic composition according to the invention also comprises one or more cationic polysaccharides.

The cationic polysaccharides that may be used in the cosmetic composition according to the invention are notably chosen from associative or non-associative cationic celluloses and galactomannan gums; preferably from non-associative cationic celluloses and galactomannan gums.

The cationic polysaccharides that may be used preferably have a weight-average molar mass (Mw) of between 500 and $5 \times 10^6$ approximately and preferably between $10^3$ and $3 \times 10^6$ approximately.

Among the cationic polysaccharides, mention may be made more particularly of cellulose ether derivatives including quaternary ammonium groups, cationic cellulose copolymers or cellulose derivatives grafted with a water-soluble quaternary ammonium monomer and cationic galactomannan gums.

The cellulose ether derivatives including quaternary ammonium groups are notably described in FR 1 492 597. They are also defined in the CTFA dictionary as quaternary ammoniums of hydroxyethylcellulose that has reacted with an epoxide substituted with a trimethylammonium group.

Mention may notably be made of the polymers sold under the name Ucare Polymer JR (JR 400 LT, JR 125 and JR 30M) or LR (LR 400 and LR 30M) by the company Amerchol.

Cationic cellulose copolymers and cellulose derivatives grafted with a water-soluble quaternary ammonium monomer are described notably in patent U.S. Pat. No. 4,131,576; mention may be made of hydroxyalkyl celluloses, for instance hydroxymethyl, hydroxyethyl or hydroxypropyl celluloses notably grafted with a methacryloylethyltrimethylammonium, methacrylamidopropyltrimethylammonium or dimethyldiallylammonium salt. Mention may be made most particularly of crosslinked or non-crosslinked quaternized hydroxyethylcelluloses, the quaternizing agent notably possibly being diallyldimethylammonium chloride; and most particularly hydroxypropyltrimethylammonium hydroxyethylcellulose.

Among the commercial products corresponding to this definition, mention may be made of the products sold under the names Celquat L 200 and Celquat H 100 by the company National Starch.

A particularly preferred cationic cellulose that may notably be mentioned is the polymer having the INCI name Polyquaternium-10.

Among the cationic polysaccharides, mention may also be made of cationic associative celluloses, or quaternized celluloses derivatives, and in particular quaternized celluloses modified with groups including at least one fatty chain, such as linear or branched alkyl groups, linear or branched arylalkyl groups, linear or branched alkylaryl groups, preferably linear or branched alkyl groups, these groups including at least 8 carbon atoms, notably from 8 to 30 carbon atoms, better still from 10 to 24 or even from 10 to 14 carbon atoms; or mixtures thereof. Preferably, mention may be made of quaternized hydroxyethylcelluloses modified with groups including at least one fatty chain, such as linear or branched alkyl groups, linear or branched arylalkyl groups, or linear or branched alkylaryl groups, preferably linear or branched alkyl groups, these groups including at least 8 carbon atoms, notably from 8 to 30 carbon atoms, better still from 10 to 24, or even from 10 to 14, carbon atoms; or mixtures thereof.

Preferentially, mention may be made of the hydroxyethylcelluloses of formula (Ib):

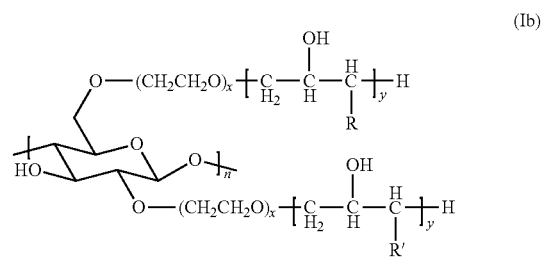

in which:
R represents an ammonium group RaRbRcN+-, Q- in which $R_a$, Rb and Rc, which may be identical or different, represent a hydrogen atom or a linear or branched C1-C30 alkyl, and Q- represents an anionic counterion such as a halide, for instance a chloride or bromide; preferably an alkyl;
R' represents an ammonium group R'aR'bR'cN+-, Q'- in which R'a, R'b and R'c, which may be identical or different, represent a hydrogen atom or a linear or branched C1-C30 alkyl, and Q'- represents an anionic counterion such as a halide, for instance a chloride or bromide; preferably an alkyl;
it being understood that at least one of the radicals Ra, Rb, Rc, R'a, R'b and R'c represents a linear or branched C8-C30 alkyl;
n, x and y, which may be identical or different, represent an integer between 1 and 10 000.

Preferably, in formula (Ib), at least one of the radicals $R_a$, Rb, Rc, R'a, R'b and R'c represents a linear or branched C8-C30, better still C10-C24, or even C10-C14, alkyl; mention may be made in particular of the dodecyl radical (C12). Preferably, the other radical(s) represent a linear or branched C1-C4 alkyl, notably methyl. Preferably, in formula (Ib), only one of the radicals Ra, Rb, Rc, R'a, R'b and R'c represents a linear or branched C8-C30, better still C10-C24, or even C10-C14, alkyl; mention may be made in particular of the dodecyl radical (C12). Preferably, the other radicals represent a linear or branched C1-C4 alkyl, notably methyl. Even better still, R may be a group chosen from —N$^+$(CH$_3$)$_3$, Q'$^-$ and —N$^+$(C$_{12}$H$_{25}$)(CH$_3$)$_2$, Q'$^-$, preferably an —N$^+$(CH$_3$)$_3$, Q'$^-$ group.

Even better still, R' may be a group —N$^+$(C$_{12}$H$_{25}$)(CH$_3$)$_2$, Q'$^-$.

The aryl radicals preferably denote phenyl, benzyl, naphthyl or anthryl groups.

Mention may notably be made of the following polymers having the INCI names:
- Polyquaternium-24, such as the product Quatrisoft LM 200®, sold by the company Amerchol/Dow Chemical;
- PG-Hydroxyethylcellulose Cocodimonium Chloride, such as the product Crodacel QM®;
- PG-Hydroxyethylcellulose Lauryldimonium Chloride (C12 alkyl), such as the product Crodacel QL®; and
- PG-Hydroxyethylcellulose Stearyldimonium Chloride (C18 alkyl), such as the product Crodacel QS®, sold by the company Croda.

Mention may also be made of the hydroxyethylcelluloses of formula (Ib) in which R represents a trimethylammonium halide and R' represents a dimethyldodecylammonium halide; preferentially, R represents trimethylammonium chloride (CH$_3$)$_3$N+-, Cl— and R' represents dimethyldodecylammonium chloride (CH$_3$)$_2$(C$_{12}$H$_{25}$)N+-, Cl—. This type of polymer is known under the INCI name Polyquaternium-67; as commercial products, mention may be made of the Softcat Polymer SL® polymers, such as SL-100, SL-60, SL-30 and SL-5, from the company Amerchol/Dow Chemical.

More particularly, the polymers of formula (Ib) are those whose viscosity is between 2000 and 3000 cPs inclusive, preferentially between 2700 and 2800 cPs. Typically, Softcat Polymer SL-5 has a viscosity of 2500 cPs, Softcat Polymer SL-30 has a viscosity of 2700 cPs, Softcat Polymer SL-60 has a viscosity of 2700 cPs and Softcat Polymer SL-100 has a viscosity of 2800 cPs;

The cationic galactomannan gums are notably described in patents U.S. Pat. Nos. 3,589,578 and 4,031,307; mention may be made of cationic guar gums, notably those comprising cationic trialkylammonium groups, notably trimethylammonium. Mention may thus be made of guar gums modified with a 2,3-epoxypropyltrimethylammonium salt (for example a chloride).

Preferably, 2% to 30% by number of the hydroxyl functions of the guar gums bear trialkylammonium cationic groups. Even more preferentially, 5% to 20% by number of the hydroxyl functions of these guar gums are branched with trialkylammonium cationic groups. Among these trialkylammonium groups, mention may most particularly be made of the trimethylammonium and triethylammonium groups. Even more preferentially, these groups represent from 5% to 20% by weight relative to the total weight of the modified guar gum. Guar gums modified with 2,3-epoxypropyltrimethylammonium chloride may be used according to the invention. Mention may be made in particular of the products having the INCI names Hydroxypropyl guar hydroxypropyltrimonium chloride and Guar hydroxypropyltrimonium chloride. Such products are notably sold under the names Jaguar C135, Jaguar C15, Jaguar C17 or Jaguar C162 by the company Rhodia.

Among the cationic polysaccharides that may be used, mention may also be made of cationic derivatives of *cassia* gum, notably those including quaternary ammonium groups; in particular, mention may be made of the product having the INCI name *Cassia* hydroxypropyltrimonium chloride.

Preferentially, the composition according to the invention comprises one or more cationic galactomannan gums, notably one or more cationic guar gums.

The cosmetic composition according to the invention may comprise the cationic polysaccharide(s) in a total amount ranging from 0.01% to 10% by weight, better still from 0.05% to 5% by weight and even better still from 0.1% to 2% by weight, relative to the total weight of the composition.

6/Additional Cationic Polymers

The cosmetic composition according to the invention may also optionally comprise one or more additional cationic polymers other than the above cationic polysaccharides.

For the purposes of the present invention, the expression "additional cationic polymer" denotes any non-saccharide and non-silicone (not comprising any silicon atoms) polymer containing cationic groups and/or groups that can be ionized into cationic groups and not containing any anionic groups and/or groups that can be ionized into anionic groups.

The additional cationic polymers that may be used preferably have a weight-average molar mass (Mw) of between 500 and 5×10$^6$ approximately and preferably between 10$^3$ and 3×10$^6$ approximately.

These polymers are preferably of ethylenic type, or even (meth)acrylic type.

Mention may be made more particularly of:
(1) homopolymers or copolymers derived from acrylic or methacrylic esters or amides and including at least one of the units having the following formula:

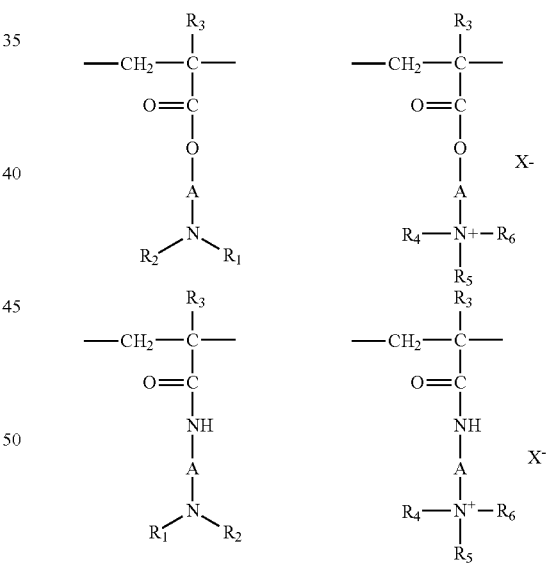

in which:
- R3, which may be identical or different, denote a hydrogen atom or a CH$_3$ radical;
- A, which may be identical or different, represent a linear or branched divalent alkyl group of 1 to 6 carbon atoms, preferably 2 or 3 carbon atoms, or a hydroxyalkyl group of 1 to 4 carbon atoms;
- R4, R5 and R6, which may be identical or different, represent an alkyl group containing from 1 to 18 carbon atoms or a benzyl radical, preferably an alkyl group containing from 1 to 6 carbon atoms;

R1 and R2, which may be identical or different, represent a hydrogen atom or an alkyl group containing from 1 to 6 carbon atoms, preferably methyl or ethyl;

X denotes an anion derived from a mineral or organic acid, such as a methosulfate anion or a halide such as chloride or bromide.

The copolymers of family (1) may also contain one or more units derived from comonomers that may be chosen from the family of acrylamides, methacrylam ides, diacetone acrylamides, acrylamides and methacrylamides substituted on the nitrogen with lower (C1-C4) alkyls, acrylic or methacrylic acid esters, vinyllactams such as vinylpyrrolidone or vinylcaprolactam, and vinyl esters.

Among these copolymers of family (1), mention may be made of:

copolymers of acrylamide and of dimethylaminoethyl methacrylate quaternized with dimethyl sulfate or with a dimethyl halide, such as that sold under the name Hercofloc by the company Hercules, copolymers of acrylamide and of methacryloyloxyethyltrimethylammonium chloride, such as the products sold under the name Bina Quat P 100 by the company Ciba Geigy, the copolymer of acrylamide and of methacryloyloxyethyltrimethylammonium methosulfate, such as that sold under the name Reten by the company Hercules, quaternized or non-quaternized vinylpyrrolidone/dialkylaminoalkyl acrylate or methacrylate copolymers, such as the products sold under the name Gafquat by the company ISP, for instance Gafquat 734 or Gafquat 755, or alternatively the products known as Copolymer 845, 958 and 937. These polymers are described in detail in French patents 2 077 143 and 2 393 573;

dimethylaminoethyl methacrylate/vinylcaprolactam/vinylpyrrolidone terpolymers, such as the product sold under the name Gaffix VC 713 by the company ISP, vinylpyrrolidone/methacrylamidopropyldimethylamine copolymers, such as the copolymers sold under the name Styleze CC 10 by ISP;

quaternized vinylpyrrolidone/dimethylam inopropylmethacrylamide copolymers such as the product sold under the name Gafquat HS 100 by the company ISP, preferably crosslinked polymers of methacryloyloxy(C1-C4)alkyltri(C1-C4)alkylammonium salts, such as the polymers obtained by homopolymerization of dimethylaminoethyl methacrylate quaternized with methyl chloride, or by copolymerization of acrylamide with dimethylaminoethyl methacrylate quaternized with methyl chloride, the homopolymerization or copolymerization being followed by crosslinking with an olefinically unsaturated compound, in particular methylenebisacrylamide. Use may be made more particularly of a crosslinked acrylamide/methacryloyloxyethyltrimethylammonium chloride copolymer (20/80 by weight) in the form of a dispersion comprising 50% by weight of said copolymer in mineral oil. This dispersion is sold under the name Salcare® SC 92 by the company Ciba. Use may also be made of a crosslinked methacryloyloxyethyltrimethylammonium chloride homopolymer comprising approximately 50% by weight of the homopolymer in mineral oil or in a liquid ester. These dispersions are sold under the names Salcare® SC 95 and Salcare® SC 96 by the company Ciba.

(2) polymers constituted of piperazinyl units and divalent alkylene or hydroxyalkylene radicals containing linear or branched chains, optionally interrupted with oxygen, sulfur or nitrogen atoms or with aromatic or heterocyclic rings, and also the oxidation and/or quaternization products of these polymers.

(3) water-soluble polyaminoamides prepared in particular by polycondensation of an acidic compound with a polyamine; these polyaminoamides may be crosslinked with an epihalohydrin, a diepoxide, a dianhydride, an unsaturated dianhydride, a bis-unsaturated derivative, a bis-halohydrin, a bis-azetidinium, a bis-haloacyldiamine, a bis-alkyl halide or alternatively with an oligomer resulting from the reaction of a difunctional compound which is reactive with a bis-halohydrin, a bis-azetidinium, a bis-haloacyldiamine, a bis-alkyl halide, an epihalohydrin, a diepoxide or a bis-unsaturated derivative; the crosslinking agent being used in proportions ranging from 0.025 to 0.35 mol per amine group of the polyaminoamide; these polyaminoamides may be alkylated or, if they include one or more tertiary amine functions, they may be quaternized.

(4) polyaminoamide derivatives resulting from the condensation of polyalkylene polyamines with polycarboxylic acids followed by alkylation with difunctional agents. Mention may be made, for example, of adipic acid/dialkylaminohydroxyalkyldialkylenetriamine polymers in which the alkyl radical includes from 1 to 4 carbon atoms and preferably denotes methyl, ethyl or propyl. Among these derivatives, mention may be made more particularly of the adipic acid/dimethylaminohydroxypropyl/diethylenetriamine polymers sold under the name Cartaretine F, F4 or F8 by the company Sandoz.

(5) polymers obtained by reacting a polyalkylene polyamine including two primary amine groups and at least one secondary amine group with a dicarboxylic acid chosen from diglycolic acid and saturated aliphatic dicarboxylic acids containing from 3 to 8 carbon atoms; the mole ratio between the polyalkylene polyamine and the dicarboxylic acid preferably being between 0.8:1 and 1.4:1; the resulting polyaminoamide being reacted with epichlorohydrin in a mole ratio of epichlorohydrin relative to the secondary amine group of the polyaminoamide preferably of between 0.5:1 and 1.8:1. Polymers of this type are sold in particular under the name Hercosett 57 by the company Hercules Inc. or else under the name PD 170 or Delsette 101 by the company Hercules in the case of the adipic acid/epoxypropyl/diethylenetriamine copolymer.

(6) alkyldiallylamine or dialkyldiallylammonium cyclopolymers, such as homopolymers or copolymers including, as main constituent of the chain, units corresponding to formula (I) or (II):

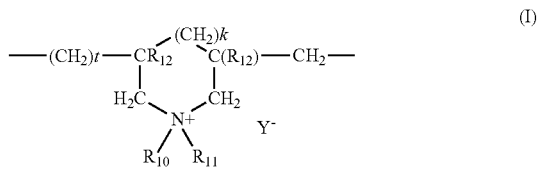

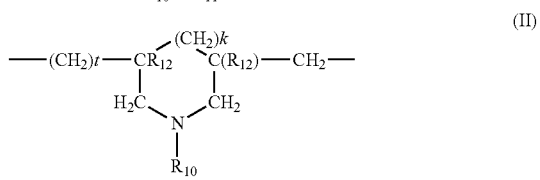

in which k and t are equal to 0 or 1, the sum k+t being equal to 1;

R12 denotes a hydrogen atom or a methyl radical;

R10 and R11, independently of each other, denote a C1-C6 alkyl group, a C1-C5 hydroxyalkyl group, a C1-C4 amidoalkyl group; or alternatively R10 and R11 may denote, together with the nitrogen atom to which they are attached, a heterocyclic group such as piperidyl or morpholinyl; R10 and R11, independently of each other, preferably denote a C1-C4 alkyl group;

$Y^-$ is an anion such as bromide, chloride, acetate, borate, citrate, tartrate, bisulfate, bisulfite, sulfate or phosphate.

Mention may be made more particularly of the homopolymer of dimethyldiallylammonium salts (for example chloride) for example having the INCI name Polyquaternium-6, in particular sold under the name Merquat 100, and the copolymers of diallyldimethylammonium salts (for example chloride) and of acrylamide, for example having the INCI name Polyquaternium-7 and in particular sold under the name Merquat 550 or Merquat 7SPR.

(7) quaternary diammonium polymers comprising repeating units of formula:

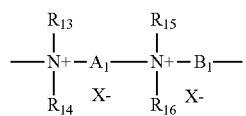
(III)

in which:

R13, R14, R15 and R16, which may be identical or different, represent aliphatic, alicyclic or arylaliphatic radicals comprising from 1 to 20 carbon atoms or C1-C12 hydroxyalkyl aliphatic radicals, or else R13, R14, R15 and R16, together or separately, constitute, with the nitrogen atoms to which they are attached, heterocycles optionally comprising a second non-nitrogen heteroatom;

or else R13, R14, R15 and R16 represent a linear or branched C1-C6 alkyl radical substituted with a nitrile, ester, acyl, amide or —CO—O—R17-D or —CO—NH—R17-D group, where R17 is an alkylene and D is a quaternary ammonium group;

A1 and B1 represent linear or branched, saturated or unsaturated, divalent polymethylene groups comprising from 2 to 20 carbon atoms, which may contain, linked to or intercalated in the main chain, one or more aromatic rings or one or more oxygen or sulfur atoms or sulfoxide, sulfone, disulfide, amino, alkylamino, hydroxyl, quaternary ammonium, ureido, amide or ester groups, and $X^-$ denotes an anion derived from a mineral or organic acid;

it being understood that A1, R13 and R15 can form, with the two nitrogen atoms to which they are attached, a piperazine ring;

in addition, if A1 denotes a linear or branched, saturated or unsaturated alkylene or hydroxyalkylene radical, B1 may also denote a group (CH2)n-CO-D-OC—(CH2)p- with n and p, which may be identical or different, being integers ranging from 2 to 20, and D denoting:

a) a glycol residue of formula —O—Z—O—, in which Z denotes a linear or branched hydrocarbon-based radical or a group corresponding to one of the following formulae: —(CH2CH2O)x-CH2CH2- and —[CH2CH(CH3)O]y-CH2CH(CH3)-, in which x and y denote an integer from 1 to 4, representing a defined and unique degree of polymerization or any number from 1 to 4 representing an average degree of polymerization;

b) a bis-secondary diamine residue, such as a piperazine derivative;

c) a bis-primary diamine residue of formula —NH—Y—NH—, in which Y denotes a linear or branched hydrocarbon-based radical, or else the divalent radical —CH2-CH2—S—S—CH2—CH2-;

d) a ureylene group of formula —NH—CO—NH—.

Preferably, $X^-$ is an anion, such as chloride or bromide. These polymers have a number-average molar mass (Mn) generally of between 1000 and 100 000.

Mention may be made more particularly of polymers that are constituted of repeating units corresponding to the formula:

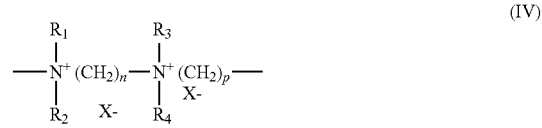
(IV)

in which R1, R2, R3 and R4, which may be identical or different, denote an alkyl or hydroxyalkyl radical containing from 1 to 4 carbon atoms, n and p are integers ranging from 2 to 20, and X— is an anion derived from a mineral or organic acid. A particularly preferred compound of formula (IV) is the one for which R1, R2, R3 and R4 represent a methyl radical and n=3, p=6 and X=Cl, known as Hexadimethrine chloride according to the INCI (CTFA) nomenclature.

(8) polyquaternary ammonium polymers comprising units of formula (V):

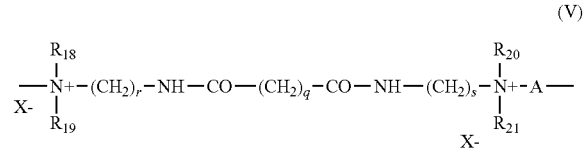
(V)

in which:

R18, R19, R20 and R21, which may be identical or different, represent a hydrogen atom or a methyl, ethyl, propyl, β-hydroxyethyl, β-hydroxypropyl or —CH2CH2(OCH2CH2)pOH radical, in which p is equal to 0 or an integer between 1 and 6, with the proviso that R18, R19, R20 and R21 do not simultaneously represent a hydrogen atom, r and s, which may be identical or different, are integers between 1 and 6, q is equal to 0 or to an integer between 1 and 34, X— denotes an anion such as a halide, A denotes a divalent dihalide radical or preferably represents —CH2—CH2-O—CH2-CH2-.

Examples that may be mentioned include the products Mirapol® A 15, Mirapol® AD1, Mirapol® AZ1 and Mirapol® 175 sold by the company Miranol.

(9) quaternary polymers of vinylpyrrolidone and of vinylimidazole, for instance the products sold under the names Luviquat® FC 905, FC 550 and FC 370 by the company BASF.

(10) polyamines such as Polyquart® H sold by Cognis, referred to under the name Polyethylene glycol (15) tallow polyamine in the CTFA dictionary.

(11) polymers including in their structure:

(a) one or more units corresponding to formula (A) below:

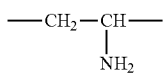

(b) optionally one or more units corresponding to formula (B) below:

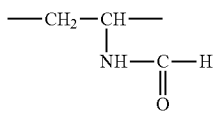

In other words, these polymers may be notably chosen from homopolymers or copolymers including one or more units derived from vinylamine and optionally one or more units derived from vinylformamide.

Preferably, these cationic polymers are chosen from polymers including, in their structure, from 5 mol % to 100 mol % of units corresponding to formula (A) and from 0 to 95 mol % of units corresponding to formula (B), preferentially from 10 mol % to 100 mol % of units corresponding to formula (A) and from 0 to 90 mol % of units corresponding to formula (B).

These polymers may be obtained, for example, by partial hydrolysis of polyvinylformamide. This hydrolysis may take place in acidic or basic medium. The weight-average molecular mass of said polymer, measured by light scattering, may range from 1000 to 3 000 000 g/mol, preferably from 10 000 to 1 000 000 and more particularly from 100 000 to 500 000 g/mol.

The polymers including units of formula (A) and optionally units of formula (B) are notably sold under the name Lupamin by the company BASF, for instance, in a non-limiting manner, the products provided under the names Lupamin 9095, Lupamin 5095, Lupamin 1095, Lupamin 9030 (or Luviquat 9030) and Lupamin 9010.

Preferably, the additional cationic polymers are chosen from those of families (1) and (6) mentioned above, better still from those of family (6), and preferentially from homopolymers or copolymers including, as main constituent of the chain, units of formula (I) or (II):

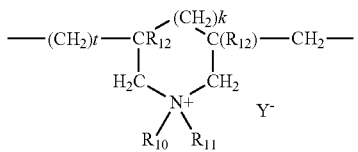

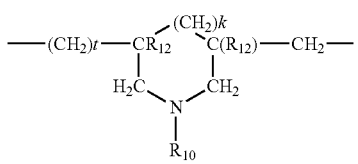

in which:

k and t are equal to 0 or 1, the sum k+t being equal to 1;

$R_{12}$ denotes a hydrogen atom or a methyl radical;

$R_{10}$ and $R_{11}$, independently of each other, denote a C1-C6 alkyl group, a C1-C5 hydroxyalkyl group, a C1-C4 amidoalkyl group; or alternatively $R_{10}$ and $R_{11}$ may denote, together with the nitrogen atom to which they are attached, a heterocyclic group such as piperidyl or morpholinyl; $R_{10}$ and $R_{11}$, independently of each other, preferably denote a C1-C4 alkyl group;

$Y^-$ is an anion such as bromide, chloride, acetate, borate, citrate, tartrate, bisulfate, bisulfite, sulfate or phosphate.

Mention may be made more particularly of the homopolymer of dimethyldiallylammonium salts (for example chloride) (Polyquaternium-6) and copolymers of diallyldimethylammonium salts (for example chloride) and of acrylamide (Polyquaternium-7).

The composition according to the invention may comprise said additional cationic polymer(s) in a total amount ranging from 0.01% to 5% by weight relative to the total weight of the composition, preferably from 0.02% to 4% by weight, better still from 0.05% to 2% by weight and preferentially from 0.08% to 1% by weight, relative to the total weight of the composition.

7/Additional Ethers

The composition according to the invention may optionally comprise one or more alcohol ethers; preferably, said ethers comprise in total from 12 to 40 carbon atoms. These ethers may be obtained from two different fatty alcohols or from two identical fatty alcohols. In particular, the alcohol may comprise from 6 to 20 carbon atoms, preferably from 8 to 12 and better still from 8 to 10 carbon atoms.

Preferably, the ethers are obtained from two identical fatty alcohols. Preferably, said fatty alcohols are caprylyl alcohol (or 1-octanol). The composition may thus advantageously comprise dicaprylyl ether (or dioctyl ether), such as the product sold under the name Cetiol OE by the company Cognis.

When they are present, said ethers may be present in the composition according to the invention in a content ranging from 0.05% to 5% by weight, notably from 0.1% to 2% by weight or even from 0.2% to 1% by weight, relative to the total weight of the composition.

8/Other Ingredients

The composition according to the invention is preferably aqueous and may comprise water in an amount preferably ranging from 50% to 98% by weight, notably from 60% to 95% by weight, better still from 70% to 90% by weight, or even from 75% to 85% by weight, relative to the total weight of the composition.

The composition may also comprise one or more organic solvents that are liquid at 25° C. and 1 atm. and notably water-soluble, such as C1-C6 alcohols, notably C1-C6 aliphatic or aromatic monoalcohols; C3-C7 polyols such as glycerol; glycols such as butylene glycol, isoprene glycol or propylene glycol; and C3-C7 polyol ethers, which may thus be used alone or as a mixture with water. Advantageously, the organic solvent may be chosen from ethanol and isopropanol, and mixtures thereof.

The pH of the composition according to the invention is advantageously between 3 and 9, preferentially between 3.5 and 7 or even between 4.5 and 6.5.

Preferably, the composition according to the invention does not comprise any (less than 0.1% by weight, preferably 0%) silicone compound, i.e. compound comprising at least one silicon atom. The composition is then said to be "silicone-free".

The cosmetic composition according to the invention may be in any presentation form conventionally used and notably in the form of an aqueous, alcoholic or aqueous-alcoholic or oily solution or suspension; a solution or dispersion of the lotion or serum type; an emulsion, an aqueous or anhydrous gel, or any other cosmetic form.

The cosmetic composition according to the invention notably finds a particularly advantageous application in the field of body and/or hair hygiene, notably for cleansing the hair and/or the scalp.

It may thus constitute a shampoo or a shower gel, or alternatively a mask to be rinsed off. Preferably, the composition according to the invention is a shampoo.

The cosmetic composition may be rinsed off or left on after having been applied to the keratin materials; it is preferably rinsed off, after an optional leave-on time which may be from a few seconds to a few minutes (for example 10 seconds to 5 minutes).

A subject of the invention is also a cosmetic treatment process, notably a hair treatment process, for caring for and/or cleansing keratin materials, notably the hair, comprising the application to said keratin materials of a cosmetic composition according to the invention, optionally followed by rinsing, after an optional leave-on time.

The invention notably relates to a cosmetic process for cleansing soiling residues from human keratin materials, in which a composition according to the invention is applied to said keratin materials in the presence of water, it is massaged to form a foam, and the foam formed and the soiling residues are then removed by rinsing with water.

The present invention is illustrated in greater detail in the examples that follow, in which the amounts are expressed as weight percentages of active material (weight % AM), unless otherwise indicated.

EXAMPLE 1

The washing compositions (shampoo) below according to the invention are prepared:

TABLE 1

| Ingredients | Composition A (weight % AM) | Composition B (weight % AM) |
|---|---|---|
| Sodium laureth sulfate | 9.8 | 9.8 |
| Cocoyl betaine | 3.5 | 3.5 |
| Oleyl alcohol | 0.175 | 0.175 |
| Hydroxypropyl guar hydroxypropyltrimonium chloride | 0.2 | 0.2 |
| Polyquaternium 7 | 0.1 | 0.1 |
| NaCl | 0.75 | 0.75 |
| Dicaprylyl ether | 0.35 | 0.3 |
| PEG-60 hydrogenated castor oil | 0.5 | — |
| PPG-5-ceteth-20 | 0.7 | 0.7 |
| Propylene glycol | 0.2 | 0.2 |
| PEG-55 propylene glycol oleate | 0.2 | 0.2 |
| pH agent | qs pH 5.3 ± 0.3 | qs pH 5.3 ± 0.3 |
| Preserving agents, fragrance, dye | qs | qs |
| Water | qs 100% | qs 100% |

Transparent compositions which have good cosmetic properties and which may be used for washing the hair are obtained. The viscosity of these compositions (cF8 at 25° C.) is between 60 and 90 seconds.

EXAMPLE 2

The washing compositions (shampoo) below according to the invention are prepared:

TABLE 2

| Ingredients | Composition C (weight % AM) | Composition D (weight % AM) |
|---|---|---|
| Sodium laureth sulfate | 9.8 | 9.8 |
| Cocoyl betaine | 3.5 | 3.5 |
| Oleyl alcohol | 0.175 | 0.175 |
| Hydroxypropyl guar hydroxypropyltrimonium chloride | 0.2 | 0.2 |
| Polyquaternium 7 | 0.1 | 0.1 |
| NaCl | 0.75 | 0.75 |
| Dicaprylyl ether | 0.35 | 0.35 |
| Fatty substance (Ricinus communis castor seed oil) and (Theobroma cacao seed butter) | 0.02 | — |
| PPG-5-ceteth-20 | 0.7 | 0.6 |
| Propylene glycol | 0.2 | 0.2 |
| PEG-55 propylene glycol oleate | 0.2 | 0.2 |
| Glycerol | — | 2 |
| pH agent | qs pH 5.3 ± 0.3 | qs pH 5.3 ± 0.3 |
| Preserving agents, fragrance | qs | qs |
| Water | qs 100% | qs 100% |

Transparent compositions which have good cosmetic properties and which may be used for washing the hair are obtained. The viscosity of these compositions (cF8 at 25° C.) is between 60 and 90 seconds.

EXAMPLE 3

The washing compositions below are prepared:

TABLE 3

| Ingredients | Composition E Invention | Comparative Composition E' |
|---|---|---|
| Sodium laureth sulfate | 9.8 | 9.8 |
| Cocoyl betaine | 3.5 | 3.5 |
| Oleyl alcohol | 0.2 | 1.0 |
| Hydroxypropyl guar hydroxypropyltrimonium chloride | 0.2 | 0.2 |
| Polyquaternium 7 | 0.1 | 0.1 |
| NaCl | 0.75 | 0.75 |
| Dicaprylyl ether | 0.35 | 0.35 |
| PPG-5-ceteth-20 | 0.2 | 0.2 |
| pH agent | qs pH 5.3 ± 0.3 | qs pH 5.3 ± 0.3 |
| Preserving agents, fragrance | qs | qs |
| Water | qs 100% | qs 100% |

Composition E according to the invention has a clear appearance, whereas comparative composition E' has a cloudy appearance.

EXAMPLE 4

The washing compositions below are prepared:

TABLE 4

| Ingredients | Composition F | Composition F' | Composition F'' | Composition F''' | Composition F'''' |
|---|---|---|---|---|---|
| Sodium laureth sulfate | 9.8 | 9.8 | 9.8 | 9.8 | 9.8 |
| Cocoyl betaine | 3.5 | 3.5 | 3.5 | 3.5 | 3.5 |

TABLE 4-continued

| Ingredients | Composition F | Composition F' | Composition F" | Composition F'" | Composition F"" |
|---|---|---|---|---|---|
| Oleyl alcohol | 0.175 | — | — | — | — |
| Octyldodecanol | — | 0.5 | — | — | — |
| Virgin olive oil | — | — | 0.175 | — | — |
| Soybean oil (*Glycine soja* oil) | — | — | — | 0.175 | — |
| Cetearyl alcohol | — | — | — | — | 0.175 |
| Hydroxypropyl guar hydroxypropyltrimonium chloride | 0.2 | 0.2 | 0.2 | 0.2 | 0.2 |
| Polyquaternium 7 | 0.1 | 0.1 | 0.1 | 0.1 | 0.1 |
| Propylene glycol | 0.2 | 0.2 | 0.2 | 0.2 | 0.2 |
| NaCl | 0.75 | 0.75 | 0.75 | 0.75 | 0.75 |
| Dicaprylyl ether | 0.35 | 0.35 | 0.35 | 0.35 | 0.35 |
| PPG-5-ceteth-20 | 0.5 | 0.5 | 0.5 | 0.5 | 0.5 |
| PEG-55 propylene glycol oleate | 0.2 | 0.2 | 0.2 | 0.2 | 0.2 |
| pH agent | qs pH 5.3 ± 0.3 | qs pH 5.3 ± 0.3 | qs pH 5.3 ± 0.3 | qs pH 5.3 ± 0.3 | qs pH 5.3 ± 0.3 |
| Preserving agents, fragrance | qs | qs | qs | qs | qs |
| Water | qs 100% | qs 100% | qs 100% | qs 100% | qs 100% |
| Transmittance (%) | 98.5 | 0.155 | 0.397 | 0.231 | |

It is observed that the composition according to the invention has a clear appearance (98.5% transmittance), whereas the comparative compositions are cloudy.

The invention claimed is:

1. A cosmetic composition, comprising:
   one or more anionic surfactants,
   one or more amphoteric surfactants,
   one or more cationic polysaccharides,
   one or more unsaturated fatty alcohols, in a total amount of less than 1% by weight, relative to the total weight of the composition, and
   one or more alcohol ethers comprising from 12 to 40 carbon atoms, having a content ranging from 0.05% to 5% by weight, relative to the total weight of the composition.

2. The cosmetic composition according to claim 1, wherein the one or more anionic surfactants is chosen from:
   (C6-C24) alkyl sulfates;
   (C6-C24) alkyl ether sulfates;
   (C6-C24) alkylsulfosuccinates;
   (C6-C24) olefin sulfonates;
   (C6-C24) alkyl ether sulfosuccinates;
   (C6-C24) acylisethionates;
   (C6-C24) acylsarcosinates;
   (C6-C24) alkyl ether carboxylates, comprising from 2 to 50 ethylene oxide groups;
   polyoxyalkylenated (C6-C24) alkylamido ether carboxylic acids and salts thereof, comprising from 2 to 50 alkylene oxide groups;
   (C6-C24) acylglutamates;
   (C6-C24) acylglycinates;
   in acid form, or in salt form wherein the salt form is of alkali metal or alkaline-earth metal, ammonium or amino alcohol salts; or
   mixtures thereof.

3. The cosmetic composition according to claim 1, wherein the one or more anionic surfactant(s) is present in a total amount ranging from 2% to 30% by weight, relative to the total weight of the composition.

4. The cosmetic composition according to claim 1, wherein the one or more amphoteric surfactants is chosen: from (C8-C20) alkylbetaines; (C8-C20) alkylamido ($C_3$-$C_8$) alkylbetaines, or mixtures thereof; and compounds of formula (IV):

$$R_a\text{—NHCH}(Y")\text{—}(CH_2)_n\text{CONH}(CH_2)_{n'}\text{—N}(R_d)(R_e) \quad (IV)$$

wherein:
Y" represents the group —COOH, —COOZ" or —$CH_2$—CH(OH)$SO_3$H or the group $CH_2CH(OH)SO_3$-Z";
$R_d$ and $R_e$, independently of each other, represent a $C_1$ to $C_4$ alkyl or hydroxyalkyl radical;
Z" represents a cationic counterion derived from an alkali metal or alkaline-earth metal, an ammonium ion, or an ion derived from an organic amine;
$R_a$" represents a $C_{10}$ to $C_{30}$ alkyl or alkenyl group of an acid $R_a$'—COOH;
n and n' denote, independently of each other, an integer ranging from 1 to 3.

5. The cosmetic composition according to claim 1, wherein the one or more amphoteric surfactant(s) is present in a total amount ranging from 0.1% to 20% by weight, relative to the total weight of the composition.

6. The cosmetic composition according to claim 1, wherein the one or more unsaturated fatty alcohol(s) corresponds to the formula R-OH, wherein R is an unsaturated hydrocarbon-based radical comprising 8 to 32 carbon atoms; and optionally comprising one or more hydroxyl (OH) groups.

7. The cosmetic composition according to claim 1, wherein the one or more unsaturated fatty alcohol(s) is chosen from oleyl alcohol, erucyl alcohol and linoleyl alcohol, or mixtures thereof.

8. The cosmetic composition according to claim 1, wherein the one or more unsaturated fatty alcohol(s) is present in a total amount ranging from 0.01% to 0.90% by weight, relative to the total weight of the composition.

9. The cosmetic composition according to claim 1, wherein the one or more cationic polysaccharide(s) is chosen from associative or non-associative cationic celluloses and galactomannan gums.

10. The cosmetic composition according to claim 1, wherein the one or more cationic polysaccharide(s) is chosen from cellulose ether derivatives including quaternary ammonium groups, cationic cellulose copolymers and cellulose derivatives grafted with a water-soluble quaternary ammonium monomer.

11. The cosmetic composition according to claim 1, wherein the one or more cationic polysaccharide(s) is chosen from cationic guar gums.

12. The cosmetic composition according to claim 11, wherein the one or more cationic polysaccharide(s) is chosen from cationic derivatives of *cassia* gum.

13. The cosmetic composition according to claim 1, wherein the one or more cationic polysaccharide(s) is present in a total amount ranging from 0.01% to 10% by weight, relative to the total weight of the composition.

14. The cosmetic composition according to claim 1, further comprising one or more additional cationic polymers other than cationic polysaccharides, wherein the one or more additional cationic polymers is chosen from:
  (1) homopolymers or copolymers derived from acrylic or methacrylic esters or amides and including at least one of the units having the following formulae:

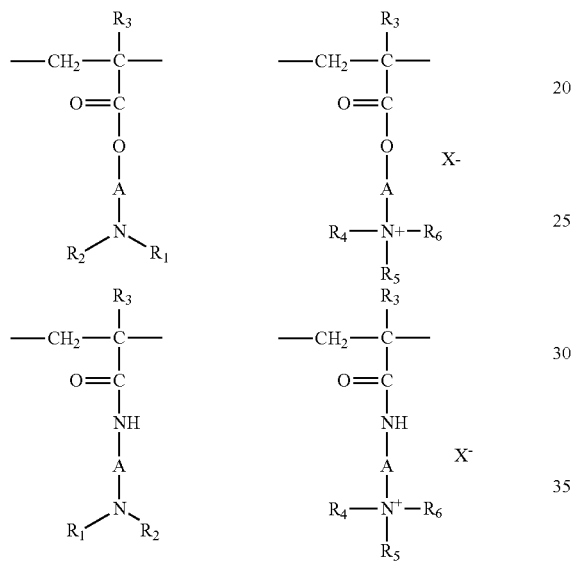

wherein:
  R3, which may be identical or different, denotes a hydrogen atom or a CH3 radical;
  A, which may be identical or different, represents a linear or branched divalent alkyl group of 1 to 6 carbon atoms or a hydroxyalkyl group of 1 to 4 carbon atoms;
  R4, R5 and R6, which may be identical or different, represent an alkyl group containing from 1 to 18 carbon atoms or a benzyl radical
  R1 and R2, which may be identical or different, represent a hydrogen atom or an alkyl group containing from 1 to 6 carbon atoms;
  X denotes an anion derived from a mineral or organic acid;
  (2) polymers comprising piperazinyl units and divalent alkylene or hydroxyalkylene radicals containing linear or branched chains, optionally interrupted with oxygen, sulfur or nitrogen atoms or with aromatic or heterocyclic rings, and the oxidation and/or quaternization products thereof;
  (3) water-soluble polyaminoamides;
  (4) polyaminoamide derivatives resulting from the condensation of polyalkylene polyamines with polycarboxylic acids followed by alkylation with difunctional agents;
  (5) polymers obtained by reacting a polyalkylene polyamine including two primary amine groups and at least one secondary amine group with a dicarboxylic acid chosen from diglycolic acid and saturated aliphatic dicarboxylic acids containing from 3 to 8 carbon atoms;
  (6) alkyldiallylamine or dialkyldiallylammonium cyclopolymers comprising units corresponding to formula (I) or (II):

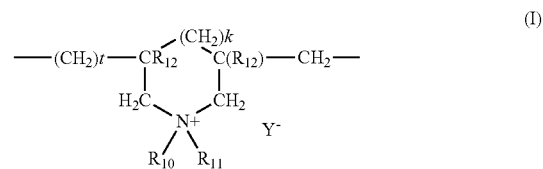

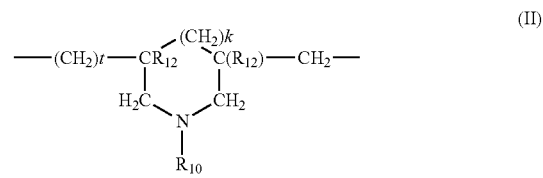

wherein:
  k and t are equal to 0 or 1, the sum k+t being equal to 1;
  R12 denotes a hydrogen atom or a methyl radical;
  R10 and R11 which may be identical or different denote a $C_1$-$C_6$ alkyl group, a $C_1$-$C_5$ hydroxyalkyl group, a $C_1$-$C_4$ amidoalkyl group; or alternatively R10 and R11 denote, together with the nitrogen atom to which they are attached, a heterocyclic group such as piperidyl or morpholinyl;
  Y⁻ is an anion such as bromide, chloride, acetate, borate, citrate, tartrate, bisulfate, bisulfite, sulfate or phosphate;
  (7) quaternary diammonium polymers comprising repeating units of formula:

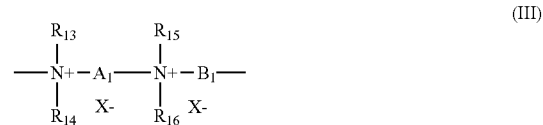

wherein:
  R13, R14, R15 and R16, which may be identical or different, represent aliphatic, alicyclic or arylaliphatic radicals comprising from 1 to 20 carbon atoms, or C1-C12 hydroxyalkyl aliphatic radicals,
  or R13, R14, R15 and R16, together or separately, comprise, with the nitrogen atoms to which they are attached, heterocycles optionally comprising a second non-nitrogen heteroatom;
  or R13, R14, R15 and R16, which may be identical or different, represent a linear or branched $C_1$-$C_6$ alkyl radical substituted with a nitrile, ester, acyl, amide or —CO—O—R17-D or —CO—NH—R17-D group, where R17 is an alkylene and D is a quaternary ammonium group;
  A1 and B1 represent linear or branched, saturated or unsaturated, divalent polymethylene groups comprising from 2 to 20 carbon atoms, which may contain, linked to or intercalated in the main chain, one or more aromatic rings or one or more oxygen or sulfur atoms or sulfoxide, sulfone, disulfide, amino, alkylamino, hydroxyl, quaternary ammonium, ureido, amide or ester groups, and X-denotes an anion derived from a mineral or organic acid;

wherein A1, R13 and R15 can form, with the two nitrogen atoms to which they are attached, a piperazine ring;

and wherein, if A1 denotes a linear or branched, saturated or unsaturated alkylene or hydroxyalkylene radical, B1 may also denote a group (CH$_2$)n—CO—D—OC—(CH$_2$)p—with n and p, which may be identical or different, being integers ranging from 2 to 20, and D denoting:

a) a glycol residue of formula —O—Z—O—, wherein Z denotes a linear or branched hydrocarbon-based radical or a group corresponding to one of the following formulae:-(CH$_2$CH$_2$O)x—CH$_2$CH$_2$— and —[CH$_2$CH(CH$_3$)O]y—CH$_2$CH (CH$_3$)—, wherein x and y denote an integer from 1 to 4, representing a defined and unique degree of polymerization or any number from 1 to 4 representing an average degree of polymerization;
  b) a bis-secondary diamine residue;
  c) a bis-primary diamine residue of formula —NH—Y-NH—, wherein Y denotes a linear or branched hydrocarbon-based radical, or else the divalent radical —CH$_2$—CH$_2$—S—S—CH$_2$—CH$_2$—;
  d) a ureylene group of formula —NH—CO—NH—, (8) polyquaternary ammonium polymers comprising units of formula (V):

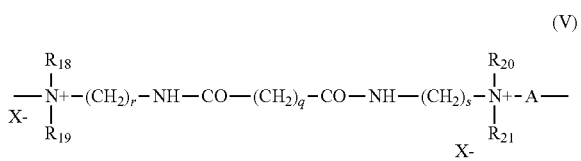

wherein:
  R18, R19, R20 and R21, which may be identical or different, represent a hydrogen atom or a methyl, ethyl, propyl, β-hydroxyethyl, β-hydroxypropyl or a
  —CH$_2$CH$_2$ (OCH2CH$_2$) pOH radical, wherein p is equal to 0 or an integer between 1 and 6, with the proviso that R18, R19, R20 and R21 do not all simultaneously represent a hydrogen atom,
  r and s, which may be identical or different, are integers between 1 and 6,
  q is equal to 0 or to an integer between 1 and 34,
  X-denotes an anion such as a halide,
  A denotes a divalent dihalide radical or represents —CH$_2$—CH$_2$—O—CH$_2$—CH$_2$—;

(9) quaternary polymers of vinylpyrrolidone and/or of vinylimidazole;
(10) polyamines;
(11) polymers comprising:
  (a) one or more units corresponding to formula (A) below:

(b) optionally one or more units corresponding to formula (B) below:

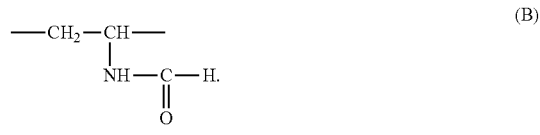

15. The cosmetic composition according to claim 14, wherein the one or more additional cationic polymers is chosen from water-soluble polyaminoamides, wherein the water-soluble polyaminoamides are prepared by polycondensation of an acidic compound with a polyamine; wherein the polyaminoamides may be crosslinked with an epihalohydrin, a diepoxide, a dianhydride, an unsaturated dianhydride, a bis-unsaturated derivative, a bis-halohydrin, a bis-azetidinium, a bis-haloacyldiamine, a bis-alkyl halide or alternatively with an oligomer resulting from the reaction of a difunctional compound which is reactive with a bis-halohydrin, a bis-azetidinium, a bis-haloacyldiamine, a bis-alkyl halide, an epihalohydrin, a diepoxide or a bis-unsaturated derivative; wherein the crosslinking agent is used in proportions ranging from 0.025 to 0.35 mol per amine group of the polyaminoamide; and wherein the polyaminoamides may be alkylated, or wherein if present, one or more tertiary amine functions of the polyaminoamides may be quaternized.

16. The cosmetic composition according to claim 14, wherein the one or more additional cationic polymers is chosen from polymers obtained by reacting a polyalkylene polyamine including two primary amine groups and at least one secondary amine group with a dicarboxylic acid chosen from diglycolic acid and saturated aliphatic dicarboxylic acids containing from 3 to 8 carbon atoms; wherein the mole ratio between the polyalkylene polyamine and the dicarboxylic acid being between 0.8:1 and 1.4:1; the resulting polyaminoamide being reacted with epichlorohydrin in a mole ratio of epichlorohydrin relative to the secondary amine group of the polyaminoamide of between 0.5:1 and 1.8:1.

17. The cosmetic composition according to claim 1, wherein the one or more alcohol ethers comprising from 12 to 40 carbon atoms comprises dicaprylyl ether.

18. The cosmetic composition according to claim 1, further comprising water in an amount ranging from 50% to 98% by weight, relative to the total weight of the composition.

19. A cosmetic treatment process for caring for and/or cleansing keratin materials, comprising:
  applying to the keratin materials a cosmetic composition comprising:
  one or more anionic surfactants,
  one or more amphoteric surfactants,
  one or more cationic polysaccharides,
  one or more unsaturated fatty alcohols, in a total amount of less than 1% by weight, relative to the total weight of the composition, and
  one or more alcohol ethers comprising from 12 to 40 carbon atoms, having a content ranging from 0.05% to 5% by weight, relative to the total weight of the composition.

20. A cosmetic treatment process for caring for and/or cleansing keratin materials according to claim 19, wherein applying the composition to said keratin materials is done in the presence of water, further comprising massaging the keratin materials to form a foam, and removing the foam formed and soiling residues from the keratin materials by rinsing with water.

* * * * *